(12) United States Patent
Günther

(10) Patent No.: US 9,943,981 B2
(45) Date of Patent: Apr. 17, 2018

(54) 3D INFILTRATION METHOD

(71) Applicant: Voxeljet AG, Friedberg (DE)

(72) Inventor: Daniel Günther, München (DE)

(73) Assignee: VOXELJET AG, Friedberg (DE)

( * ) Notice: Subject to any disclaimer, the term of this patent is extended or adjusted under 35 U.S.C. 154(b) by 0 days.

(21) Appl. No.: 15/100,775

(22) PCT Filed: Dec. 5, 2014

(86) PCT No.: PCT/DE2014/000621
§ 371 (c)(1),
(2) Date: Jun. 1, 2016

(87) PCT Pub. No.: WO2015/085983
PCT Pub. Date: Jun. 18, 2015

(65) Prior Publication Data
US 2016/0303762 A1    Oct. 20, 2016

(30) Foreign Application Priority Data
Dec. 11, 2013   (DE) .................. 10 2013 020 491

(51) Int. Cl.
*B28B 1/00*       (2006.01)
*B29C 64/165*     (2017.01)
(Continued)

(52) U.S. Cl.
CPC ............. *B28B 7/465* (2013.01); *B22F 3/10* (2013.01); *B23K 31/02* (2013.01); *B28B 1/001* (2013.01); *B28B 7/44* (2013.01); *B28B 11/04* (2013.01); *B28B 11/045* (2013.01); *B28B 11/048* (2013.01); *B28B 11/24* (2013.01); *B29C 64/165* (2017.08); *B33Y 10/00* (2014.12); *B33Y 40/00* (2014.12); *B33Y 70/00* (2014.12); *B33Y 80/00* (2014.12); *C04B 37/026* (2013.01); *C04B 41/4545* (2013.01); *B29K 2105/251* (2013.01); *C04B 2237/12* (2013.01); *C04B 2237/121* (2013.01); *C04B 2237/124* (2013.01); *C04B 2237/125* (2013.01); *C04B 2237/366* (2013.01);
(Continued)

(58) Field of Classification Search
None
See application file for complete search history.

(56) References Cited

U.S. PATENT DOCUMENTS 3,913,503 A    10/1975   Becker
4,247,508 A    1/1981    Housholder
(Continued)

FOREIGN PATENT DOCUMENTS

AU    720255 B2    5/2000
DE    3221357 A1   12/1983
(Continued)

OTHER PUBLICATIONS

US 4,937,420, 06/1990, Deckard (withdrawn)
(Continued)

*Primary Examiner* — Mary Lynn F Theisen
(74) *Attorney, Agent, or Firm* — The Dobrusin Law Firm, P.C.

(57) ABSTRACT

The invention relates to a method for producing three-dimensional molded parts in two method steps and infiltrating the molded part, as well as a material system.

20 Claims, 3 Drawing Sheets

(51) Int. Cl.

| | | |
|---|---|---|
| *B33Y 10/00* | (2015.01) | |
| *B33Y 40/00* | (2015.01) | |
| *B33Y 80/00* | (2015.01) | |
| *B28B 7/46* | (2006.01) | |
| *B33Y 70/00* | (2015.01) | |
| *C04B 37/02* | (2006.01) | |
| *B22F 3/10* | (2006.01) | |
| *B23K 31/02* | (2006.01) | |
| *B28B 7/44* | (2006.01) | |
| *B28B 11/04* | (2006.01) | |
| *B28B 11/24* | (2006.01) | |
| *C04B 41/45* | (2006.01) | |
| *B29K 105/00* | (2006.01) | |

(52) U.S. Cl.
CPC .. *C04B 2237/402* (2013.01); *C04B 2237/407* (2013.01)

(56) References Cited

U.S. PATENT DOCUMENTS

| | | |
|---|---|---|
| 4,575,330 A | 3/1986 | Hull |
| 4,591,402 A | 5/1986 | Evans et al. |
| 4,600,733 A | 7/1986 | Ohashi et al. |
| 4,665,492 A | 5/1987 | Masters |
| 4,669,634 A | 6/1987 | Leroux |
| 4,711,669 A | 12/1987 | Paul et al. |
| 4,752,352 A | 6/1988 | Feygin |
| 4,752,498 A | 6/1988 | Fudim |
| 4,863,538 A | 9/1989 | Deckard |
| 4,938,816 A | 7/1990 | Beaman et al. |
| 4,944,817 A | 7/1990 | Bourell et al. |
| 5,017,753 A | 5/1991 | Deckard |
| 5,031,120 A | 7/1991 | Pomerantz et al. |
| 5,047,182 A | 9/1991 | Sundback et al. |
| 5,053,090 A | 10/1991 | Beaman et al. |
| 5,059,266 A | 10/1991 | Yamane et al. |
| 5,076,869 A | 12/1991 | Bourell et al. |
| 5,120,476 A | 6/1992 | Scholz |
| 5,126,529 A | 6/1992 | Weiss et al. |
| 5,127,037 A | 6/1992 | Bynum |
| 5,132,143 A | 7/1992 | Deckard |
| 5,134,569 A | 7/1992 | Masters |
| 5,136,515 A | 8/1992 | Helinski |
| 5,140,937 A | 8/1992 | Yamane et al. |
| 5,147,587 A | 9/1992 | Marcus et al. |
| 5,149,548 A | 9/1992 | Yamane et al. |
| 5,155,324 A | 10/1992 | Deckard et al. |
| 5,156,697 A | 10/1992 | Bourell et al. |
| 5,182,170 A | 1/1993 | Marcus et al. |
| 5,204,055 A | 4/1993 | Sachs et al. |
| 5,216,616 A | 6/1993 | Masters |
| 5,229,209 A | 7/1993 | Gharapetian et al. |
| 5,248,456 A | 8/1993 | Evans, Jr. et al. |
| 5,252,264 A | 10/1993 | Forderhase et al. |
| 5,263,130 A | 11/1993 | Pomerantz et al. |
| 5,269,982 A | 12/1993 | Brotz |
| 5,284,695 A | 2/1994 | Barlow et al. |
| 5,296,062 A | 3/1994 | Bourell et al. |
| 5,316,580 A | 5/1994 | Deckard |
| 5,324,617 A | 6/1994 | Majima et al. |
| 5,340,656 A | 8/1994 | Sachs et al. |
| 5,342,919 A | 8/1994 | Dickens, Jr. et al. |
| 5,352,405 A | 10/1994 | Beaman et al. |
| 5,354,414 A | 10/1994 | Feygin |
| 5,382,308 A | 1/1995 | Bourell et al. |
| 5,387,380 A | 2/1995 | Cima et al. |
| 5,398,193 A | 3/1995 | deAngelis |
| 5,418,112 A | 5/1995 | Mirle et al. |
| 5,427,722 A | 6/1995 | Fouts et al. |
| 5,431,967 A | 7/1995 | Manthiram et al. |
| 5,433,261 A | 7/1995 | Hinton |
| 5,482,659 A | 1/1996 | Sauerhoefer |
| 5,490,962 A | 2/1996 | Cima et al. |
| 5,503,785 A | 4/1996 | Crump et al. |
| 5,506,607 A | 4/1996 | Sanders, Jr. et al. |
| 5,518,060 A | 5/1996 | Cleary et al. |
| 5,518,680 A | 5/1996 | Cima et al. |
| 5,555,176 A | 9/1996 | Menhennett et al. |
| 5,573,721 A | 11/1996 | Gillette |
| 5,589,222 A | 12/1996 | Thometzek et al. |
| 5,597,589 A | 1/1997 | Deckard |
| 5,616,294 A | 4/1997 | Deckard |
| 5,616,631 A | 4/1997 | Kiuchi et al. |
| 5,637,175 A | 6/1997 | Feygin et al. |
| 5,639,070 A | 6/1997 | Deckard |
| 5,639,402 A | 6/1997 | Barlow et al. |
| 5,647,931 A | 7/1997 | Retallick et al. |
| 5,658,412 A | 8/1997 | Retallick et al. |
| 5,665,401 A | 9/1997 | Serbin et al. |
| 5,717,599 A | 2/1998 | Menhennett et al. |
| 5,730,925 A | 3/1998 | Mattes et al. |
| 5,740,051 A | 4/1998 | Sanders, Jr. et al. |
| 5,747,105 A | 5/1998 | Haubert |
| 5,749,041 A | 5/1998 | Lakshminarayan et al. |
| 5,753,274 A | 5/1998 | Wilkening et al. |
| 5,807,437 A | 9/1998 | Sachs et al. |
| 5,837,960 A | 11/1998 | Lewis et al. |
| 5,851,465 A | 12/1998 | Bredt |
| 5,884,688 A | 3/1999 | Hinton et al. |
| 5,902,441 A | 5/1999 | Bredt et al. |
| 5,902,537 A | 5/1999 | Almquist et al. |
| 5,904,889 A | 5/1999 | Serbin et al. |
| 5,934,343 A | 8/1999 | Gaylo et al. |
| 5,940,674 A | 8/1999 | Sachs et al. |
| 5,943,235 A | 8/1999 | Earl et al. |
| 5,989,476 A | 11/1999 | Lockard et al. |
| 5,997,795 A | 12/1999 | Danforth |
| 6,007,318 A | 12/1999 | Russell et al. |
| 6,036,777 A | 3/2000 | Sachs |
| 6,042,774 A | 3/2000 | Wilkening et al. |
| 6,048,188 A | 4/2000 | Hull et al. |
| 6,048,954 A | 4/2000 | Barlow et al. |
| 6,133,353 A | 10/2000 | Bui et al. |
| 6,146,567 A | 11/2000 | Sachs et al. |
| 6,147,138 A | 11/2000 | Hochsmann et al. |
| 6,155,331 A | 12/2000 | Langer et al. |
| 6,164,850 A | 12/2000 | Speakman |
| 6,165,406 A | 12/2000 | Jang et al. |
| 6,169,605 B1 | 1/2001 | Penn et al. |
| 6,175,422 B1 | 1/2001 | Penn et al. |
| 6,193,922 B1 | 2/2001 | Ederer |
| 6,210,625 B1 | 4/2001 | Matsushita |
| 6,216,508 B1 | 4/2001 | Matsubara et al. |
| 6,217,816 B1 | 4/2001 | Tang |
| 6,259,962 B1 | 7/2001 | Gothait |
| 6,270,335 B2 | 8/2001 | Leyden et al. |
| 6,305,769 B1 | 10/2001 | Thayer et al. |
| 6,316,060 B1 | 11/2001 | Elvidge et al. |
| 6,318,418 B1 | 11/2001 | Grossmann et al. |
| 6,335,052 B1 | 1/2002 | Suzuki et al. |
| 6,335,097 B1 | 1/2002 | Otsuka et al. |
| 6,350,495 B1 | 2/2002 | Schriener et al. |
| 6,355,196 B1 | 3/2002 | Kotnis et al. |
| 6,375,874 B1 | 4/2002 | Russell et al. |
| 6,395,811 B1 | 5/2002 | Nguyen et al. |
| 6,401,001 B1 | 6/2002 | Jang et al. |
| 6,403,002 B1 | 6/2002 | Van Der Geest |
| 6,405,095 B1 | 6/2002 | Jang et al. |
| 6,416,850 B1 | 7/2002 | Bredt et al. |
| 6,423,255 B1 | 7/2002 | Hoechsmann et al. |
| 6,460,979 B1 | 10/2002 | Heinzl et al. |
| 6,476,122 B1 | 11/2002 | Leyden |
| 6,485,831 B1 | 11/2002 | Fukushima et al. |
| 6,500,378 B1 | 12/2002 | Smith |
| 6,554,600 B1 | 4/2003 | Hofmann et al. |
| 6,596,224 B1 | 7/2003 | Sachs et al. |
| 6,610,429 B2 | 8/2003 | Bredt et al. |
| 6,616,030 B2 | 9/2003 | Miller |
| 6,658,314 B1 | 12/2003 | Gothait |
| 6,672,343 B1 | 1/2004 | Perret et al. |
| 6,713,125 B1 | 3/2004 | Sherwood et al. |
| 6,722,872 B1 | 4/2004 | Swanson et al. |

(56) References Cited

U.S. PATENT DOCUMENTS

| | | |
|---|---|---|
| 6,733,528 B2 | 5/2004 | Abe et al. |
| 6,742,456 B1 | 6/2004 | Kasperchik et al. |
| 6,764,636 B1 | 7/2004 | Allanic et al. |
| 6,827,988 B2 | 12/2004 | Krause et al. |
| 6,830,643 B1 | 12/2004 | Hayes |
| 6,838,035 B1 | 1/2005 | Ederer et al. |
| 6,855,205 B2 | 2/2005 | McQuate et al. |
| 6,896,839 B2 | 5/2005 | Kubo et al. |
| 6,972,115 B1 | 12/2005 | Ballard |
| 6,989,115 B2 | 1/2006 | Russell et al. |
| 7,004,222 B2 | 2/2006 | Ederer et al. |
| 7,037,382 B2 | 5/2006 | Davidson et al. |
| 7,048,530 B2 | 5/2006 | Gaillard et al. |
| 7,049,363 B2 | 5/2006 | Shen |
| 7,087,109 B2 | 8/2006 | Bredt et al. |
| 7,120,512 B2 | 10/2006 | Kramer et al. |
| 7,137,431 B2 | 11/2006 | Ederer et al. |
| 7,153,463 B2 | 12/2006 | Leuterer et al. |
| 7,204,684 B2 | 4/2007 | Ederer et al. |
| 7,220,380 B2 | 5/2007 | Farr et al. |
| 7,291,002 B2 | 11/2007 | Russell et al. |
| 7,296,990 B2 | 11/2007 | Devos et al. |
| 7,332,537 B2 | 2/2008 | Bredt et al. |
| 7,348,075 B2 | 3/2008 | Farr et al. |
| 7,378,052 B2 | 5/2008 | Harryson |
| 7,381,360 B2 | 6/2008 | Oriakhi et al. |
| 7,387,359 B2 | 6/2008 | Hernandez et al. |
| 7,402,330 B2 | 7/2008 | Pfeiffer et al. |
| 7,431,987 B2 | 10/2008 | Pfeiffer et al. |
| 7,435,072 B2 | 10/2008 | Collins et al. |
| 7,435,368 B2 | 10/2008 | Davidson et al. |
| 7,455,804 B2 | 11/2008 | Patel et al. |
| 7,455,805 B2 | 11/2008 | Oriakhi et al. |
| 7,497,977 B2 | 3/2009 | Nielsen et al. |
| 7,531,117 B2 | 5/2009 | Ederer et al. |
| 7,550,518 B2 | 6/2009 | Bredt et al. |
| 7,578,958 B2 | 8/2009 | Patel et al. |
| 7,597,835 B2 | 10/2009 | Marsac |
| 7,641,461 B2 | 1/2010 | Khoshnevis |
| 7,665,636 B2 | 2/2010 | Ederer et al. |
| 7,722,802 B2 | 5/2010 | Pfeiffer et al. |
| 7,736,578 B2 | 6/2010 | Ederer et al. |
| 7,748,971 B2 | 7/2010 | Hochsmann et al. |
| 7,767,130 B2 | 8/2010 | Elsner et al. |
| 7,795,349 B2 | 9/2010 | Bredt et al. |
| 7,799,253 B2 | 9/2010 | Höchsmann et al. |
| 7,807,077 B2 | 10/2010 | Ederer et al. |
| 7,879,393 B2 | 2/2011 | Ederer et al. |
| 7,887,264 B2 | 2/2011 | Naunheimer et al. |
| 7,927,539 B2 | 4/2011 | Ederer |
| 8,020,604 B2 | 9/2011 | Hochsmann et al. |
| 8,096,262 B2 | 1/2012 | Ederer et al. |
| 8,186,415 B2 | 5/2012 | Marutani et al. |
| 8,349,233 B2 | 1/2013 | Ederer et al. |
| 8,506,870 B2 | 8/2013 | Hochsmann et al. |
| 8,524,142 B2 | 9/2013 | Unkelmann et al. |
| 8,574,485 B2 | 11/2013 | Kramer |
| 8,715,832 B2 | 5/2014 | Ederer et al. |
| 8,727,672 B2 | 5/2014 | Ederer et al. |
| 8,741,194 B1 | 6/2014 | Ederer et al. |
| 8,911,226 B2 | 12/2014 | Gunther et al. |
| 8,951,033 B2 | 2/2015 | Höchsmann et al. |
| 8,956,140 B2 | 2/2015 | Hartmann |
| 8,956,144 B2 | 2/2015 | Grasegger et al. |
| 8,992,205 B2 | 3/2015 | Ederer et al. |
| 9,174,391 B2 | 11/2015 | Hartmann et al. |
| 9,174,392 B2 | 11/2015 | Hartmann |
| 9,242,413 B2 | 1/2016 | Hartmann et al. |
| 9,321,934 B2 | 4/2016 | Mögele et al. |
| 9,327,450 B2 | 5/2016 | Hein et al. |
| 9,333,709 B2 | 5/2016 | Hartmann |
| 9,358,701 B2 | 6/2016 | Gnuchtel et al. |
| 2001/0045678 A1 | 11/2001 | Kubo et al. |
| 2001/0050031 A1 | 12/2001 | Bredt et al. |
| 2002/0015783 A1 | 2/2002 | Harvey |
| 2002/0016387 A1 | 2/2002 | Shen |
| 2002/0026982 A1 | 3/2002 | Bredt et al. |
| 2002/0079601 A1 | 6/2002 | Russell et al. |
| 2002/0090410 A1 | 7/2002 | Tochimoto et al. |
| 2002/0111707 A1 | 8/2002 | Li et al. |
| 2002/0155254 A1 | 10/2002 | McQuate et al. |
| 2002/0167100 A1 | 11/2002 | Moszner et al. |
| 2003/0004599 A1 | 1/2003 | Herbak |
| 2003/0065400 A1 | 4/2003 | Beam et al. |
| 2003/0069638 A1 | 4/2003 | Barlow et al. |
| 2003/0083771 A1 | 5/2003 | Schmidt |
| 2003/0113729 A1 | 6/2003 | DaQuino et al. |
| 2003/0114936 A1 | 6/2003 | Sherwood et al. |
| 2004/0003738 A1 | 1/2004 | Imiolek et al. |
| 2004/0012112 A1 | 1/2004 | Davidson et al. |
| 2004/0025905 A1 | 2/2004 | Ederer et al. |
| 2004/0026418 A1 | 2/2004 | Ederer et al. |
| 2004/0035542 A1 | 2/2004 | Ederer et al. |
| 2004/0036200 A1 | 2/2004 | Patel et al. |
| 2004/0038009 A1 | 2/2004 | Leyden et al. |
| 2004/0045941 A1 | 3/2004 | Herzog et al. |
| 2004/0056378 A1 | 3/2004 | Bredt et al. |
| 2004/0084814 A1 | 5/2004 | Boyd et al. |
| 2004/0094058 A1 | 5/2004 | Kasperchik et al. |
| 2004/0104515 A1 | 6/2004 | Swanson et al. |
| 2004/0112523 A1 | 6/2004 | Crom |
| 2004/0138336 A1 | 7/2004 | Bredt et al. |
| 2004/0145088 A1 | 7/2004 | Patel et al. |
| 2004/0170765 A1 | 9/2004 | Ederer et al. |
| 2004/0187714 A1 | 9/2004 | Napadensky et al. |
| 2004/0207123 A1 | 10/2004 | Patel et al. |
| 2004/0239009 A1 | 12/2004 | Collins et al. |
| 2005/0003189 A1 | 1/2005 | Bredt et al. |
| 2005/0017386 A1 | 1/2005 | Harrysson |
| 2005/0017394 A1 | 1/2005 | Hochsmann et al. |
| 2005/0074511 A1 | 4/2005 | Oriakhi et al. |
| 2005/0093194 A1 | 5/2005 | Oriakhi et al. |
| 2005/0167872 A1 | 8/2005 | Ederer et al. |
| 2005/0174407 A1 | 8/2005 | Johnson et al. |
| 2005/0179167 A1 | 8/2005 | Hachikian |
| 2005/0212163 A1 | 9/2005 | Bausinger et al. |
| 2005/0218549 A1 | 10/2005 | Farr et al. |
| 2005/0219942 A1 | 10/2005 | Wallgren |
| 2005/0280185 A1* | 12/2005 | Russell ............... B28B 1/001 264/308 |
| 2005/0283136 A1 | 12/2005 | Skarda |
| 2006/0013659 A1 | 1/2006 | Pfeiffer et al. |
| 2006/0105102 A1 | 5/2006 | Hochsmann et al. |
| 2006/0108090 A1 | 5/2006 | Ederer et al. |
| 2006/0159896 A1 | 7/2006 | Pfeifer et al. |
| 2006/0176346 A1 | 8/2006 | Ederer et al. |
| 2006/0208388 A1 | 9/2006 | Bredet et al. |
| 2006/0237159 A1 | 10/2006 | Hochsmann |
| 2006/0251535 A1 | 11/2006 | Pfeifer et al. |
| 2006/0254467 A1 | 11/2006 | Farr et al. |
| 2006/0257579 A1 | 11/2006 | Farr et al. |
| 2007/0045891 A1 | 3/2007 | Martinoni |
| 2007/0054143 A1 | 3/2007 | Otoshi |
| 2007/0057412 A1 | 3/2007 | Weiskopf et al. |
| 2007/0065397 A1 | 3/2007 | Ito et al. |
| 2007/0126157 A1 | 6/2007 | Bredt |
| 2007/0215020 A1 | 9/2007 | Miller |
| 2007/0238056 A1 | 10/2007 | Baumann et al. |
| 2008/0001331 A1 | 1/2008 | Ederer |
| 2008/0018018 A1 | 1/2008 | Nielsen et al. |
| 2008/0047628 A1 | 2/2008 | Davidson et al. |
| 2008/0138515 A1 | 6/2008 | Williams |
| 2008/0187711 A1 | 8/2008 | Alam et al. |
| 2008/0233302 A1 | 9/2008 | Elsner |
| 2008/0237933 A1 | 10/2008 | Hochsmann et al. |
| 2008/0241404 A1 | 10/2008 | Allaman et al. |
| 2008/0260945 A1 | 10/2008 | Ederer et al. |
| 2008/0299321 A1 | 12/2008 | Ishihara |
| 2009/0011066 A1 | 1/2009 | Davidson et al. |
| 2009/0068376 A1 | 3/2009 | Philippi et al. |
| 2009/0261497 A1 | 10/2009 | Ederer et al. |
| 2010/0007062 A1 | 1/2010 | Larsson et al. |
| 2010/0026743 A1 | 2/2010 | Van Thillo et al. |
| 2010/0152865 A1 | 6/2010 | Jonsson et al. |

(56) References Cited

U.S. PATENT DOCUMENTS

| | | |
|---|---|---|
| 2010/0207288 A1 | 8/2010 | Dini |
| 2010/0212584 A1 | 8/2010 | Ederer et al. |
| 2010/0243123 A1 | 9/2010 | Ederer et al. |
| 2010/0244301 A1 | 9/2010 | Ederer et al. |
| 2010/0247742 A1 | 9/2010 | Shi et al. |
| 2010/0272519 A1 | 10/2010 | Ederer et al. |
| 2010/0279007 A1 | 11/2010 | Briselden et al. |
| 2010/0291314 A1 | 11/2010 | Kashani-Shirazi |
| 2010/0323301 A1 | 12/2010 | Tang |
| 2011/0049739 A1 | 3/2011 | Uckelmann et al. |
| 2011/0059247 A1 | 3/2011 | Kuzusako et al. |
| 2011/0177188 A1 | 7/2011 | Bredt et al. |
| 2011/0223437 A1 | 9/2011 | Ederer et al. |
| 2011/0308755 A1 | 12/2011 | Hochsmann |
| 2012/0046779 A1 | 2/2012 | Pax et al. |
| 2012/0094026 A1 | 4/2012 | Ederer et al. |
| 2012/0097258 A1 | 4/2012 | Hartmann |
| 2012/0113439 A1 | 5/2012 | Ederer |
| 2012/0126457 A1 | 5/2012 | Abe et al. |
| 2012/0189102 A1 | 7/2012 | Maurer, Jr. et al. |
| 2012/0291701 A1 | 11/2012 | Grasegger et al. |
| 2012/0329943 A1 | 12/2012 | Hicks et al. |
| 2013/0000549 A1 | 1/2013 | Hartmann et al. |
| 2013/0004610 A1 | 1/2013 | Hartmann et al. |
| 2013/0026680 A1 | 1/2013 | Ederer et al. |
| 2013/0029001 A1 | 1/2013 | Gunther et al. |
| 2013/0092082 A1 | 4/2013 | Ederer et al. |
| 2013/0157193 A1 | 6/2013 | Moritani et al. |
| 2013/0189434 A1 | 7/2013 | Randall et al. |
| 2013/0199444 A1 | 8/2013 | Hartmann |
| 2013/0234355 A1 | 9/2013 | Hartmann et al. |
| 2013/0302575 A1 | 11/2013 | Mogele et al. |
| 2013/0313757 A1 | 11/2013 | Kashani-Shirazi |
| 2014/0048980 A1 | 2/2014 | Crump et al. |
| 2014/0202381 A1 | 7/2014 | Ederer et al. |
| 2014/0202382 A1 | 7/2014 | Ederer |
| 2014/0212677 A1 | 7/2014 | Gnuchtel et al. |
| 2014/0227123 A1 | 8/2014 | Gunster |
| 2014/0236339 A1 | 8/2014 | Fagan |
| 2014/0252672 A1* | 9/2014 | Rael ............. B29C 67/0081 264/128 |
| 2014/0271961 A1 | 9/2014 | Khoshnevis |
| 2014/0306379 A1 | 10/2014 | Hartmann et al. |
| 2014/0322501 A1 | 10/2014 | Ederer et al. |
| 2015/0042018 A1 | 2/2015 | Gunther et al. |
| 2015/0069659 A1 | 3/2015 | Hartmann |
| 2015/0110910 A1 | 4/2015 | Hartmann et al. |
| 2015/0165574 A1 | 6/2015 | Ederer et al. |
| 2015/0210822 A1 | 7/2015 | Ederer et al. |
| 2015/0224718 A1 | 8/2015 | Ederer et al. |
| 2015/0266238 A1 | 9/2015 | Ederer et al. |
| 2015/0273572 A1 | 10/2015 | Ederer et al. |
| 2015/0290881 A1 | 10/2015 | Ederer et al. |
| 2015/0375418 A1 | 12/2015 | Hartmann |
| 2015/0375419 A1 | 12/2015 | Gunther et al. |
| 2016/0001507 A1 | 1/2016 | Hartmann et al. |
| 2016/0052165 A1 | 2/2016 | Hartmann |
| 2016/0052166 A1 | 2/2016 | Hartmann |
| 2016/0318251 A1 | 3/2016 | Ederer et al. |
| 2016/0107386 A1 | 4/2016 | Hartmann et al. |
| 2016/0114533 A1 | 4/2016 | Grasegger et al. |
| 2016/0263828 A1 | 9/2016 | Ederer et al. |
| 2016/0303762 A1 | 10/2016 | Gunther |
| 2016/0311167 A1 | 10/2016 | Gunther et al. |
| 2016/0311210 A1 | 10/2016 | Gunther et al. |
| 2017/0028630 A1 | 2/2017 | Ederer et al. |
| 2017/0050378 A1 | 2/2017 | Ederer |
| 2017/0050387 A1 | 2/2017 | Ederer |
| 2017/0106595 A1 | 4/2017 | Gunther et al. |
| 2017/0136524 A1 | 5/2017 | Ederer et al. |
| 2017/0151727 A1 | 6/2017 | Ederer et al. |
| 2017/0157852 A1 | 6/2017 | Ederer et al. |
| 2017/0182711 A1 | 6/2017 | Gunther et al. |
| 2017/0197367 A1 | 7/2017 | Ederer et al. |
| 2017/0210037 A1 | 7/2017 | Ederer et al. |
| 2017/0217098 A1 | 8/2017 | Hartmann et al. |

FOREIGN PATENT DOCUMENTS

| | | |
|---|---|---|
| DE | 3930750 C2 | 3/1991 |
| DE | 4102260 A1 | 7/1992 |
| DE | 4305201 C1 | 4/1994 |
| DE | 4 325 573 | 2/1995 |
| DE | 29506204 U1 | 6/1995 |
| DE | 4440397 | 9/1995 |
| DE | 19525307 A1 | 1/1997 |
| DE | 19530295 C1 | 1/1997 |
| DE | 19528215 A1 | 2/1997 |
| DE | 29701279 U1 | 5/1997 |
| DE | 19545167 A1 | 6/1997 |
| DE | 69031808 T2 | 4/1998 |
| DE | 19853834 | 5/2000 |
| DE | 69634921 T2 | 12/2005 |
| DE | 201 22 639 U1 | 11/2006 |
| DE | 10 2006 040 305 A1 | 3/2007 |
| DE | 102006029298 A1 | 12/2007 |
| DE | 102007040755 A1 | 3/2009 |
| DE | 102007047326 A1 | 4/2009 |
| DE | 102011105688 A1 | 12/2012 |
| DE | 102011053205 A1 | 3/2013 |
| DE | 102015006363 A1 | 12/2016 |
| DE | 102015008860 A1 | 1/2017 |
| DE | 102015011503 A1 | 3/2017 |
| DE | 102015011790 A1 | 3/2017 |
| EP | 361847 B1 | 4/1990 |
| EP | 0431924 A2 | 6/1991 |
| EP | 1415792 | 5/2004 |
| EP | 1457590 A | 9/2004 |
| EP | 1381504 B1 | 8/2007 |
| GB | 2297516 A | 8/1996 |
| JP | S62275734 A | 11/1987 |
| JP | 2003136605 A | 5/2003 |
| JP | 2004082206 A | 3/2004 |
| JP | 2009202451 | 9/2009 |
| WO | 01/40866 A2 | 6/2001 |
| WO | 2001/078969 A2 | 10/2001 |
| WO | 2004/014637 A1 | 2/2004 |
| WO | 2016058577 A1 | 4/2006 |
| WO | 2016095888 A1 | 6/2006 |
| WO | 2006/100166 A1 | 9/2006 |
| WO | 2008/049384 A1 | 5/2008 |
| WO | 2008061520 A2 | 5/2008 |
| WO | 2011063786 A1 | 6/2011 |
| WO | 2012/164078 A2 | 12/2012 |
| WO | 2013075696 A1 | 5/2013 |
| WO | 2014090207 A1 | 6/2014 |
| WO | 2014166469 A1 | 10/2014 |
| WO | 2015078430 A1 | 6/2015 |
| WO | 2015081926 A1 | 6/2015 |
| WO | 2015085983 A2 | 6/2015 |
| WO | 2015090265 A1 | 6/2015 |
| WO | 2015090567 A1 | 6/2015 |
| WO | 2015096826 A1 | 7/2015 |
| WO | 2015149742 A1 | 10/2015 |
| WO | 2015180703 A1 | 12/2015 |
| WO | 2016019937 A1 | 2/2016 |
| WO | 2016019942 A1 | 2/2016 |
| WO | 2016101942 A1 | 6/2016 |
| WO | 2016146095 A1 | 9/2016 |

OTHER PUBLICATIONS

International Search Report, Application No. PCT/DE2014/000621, dated Jun. 1, 2015.
Written Opinion of the International Search Authority, Application No. PCT/DE2014/000621, dated Jun. 1, 2015.
Marcus et al., Solid Freedom Fabrication Proceedings, Nov. 1993.
Cima et al., "Computer-derived Microstructures by 3D Printing: Bio- and Structural Materials," SFF Symposium, Austin, TX, 1994.
Marcus, et al., Solid Freeform Fabrication Proceedings, Sep. 1995, p. 130-33.

(56) References Cited

OTHER PUBLICATIONS

Gebhart, Rapid Prototyping, pp. 118-119, 1996.
Feature Article—Rapid Tooling—Cast Resin and Sprayed Metal Tooling by Joel Segal, Apr. 2000.
EOS Operating Manual for Laser Sintering Machine with Brief Summary Feb. 22, 2005.
Sachs, E., P. Williams, D. Brancazio, M. Cima, and K. Kremmin, Three dimensional printing: Rapid Tooling and Prototypes Directly from a CAD Model. In Proceedings of Manufacturing International 1990 (Atlanta, GA, Mar. 25-28). ASME, New York, 1990, pp. 131-136.
Sachs et al., "Three-Dimensional Printing: Rapid Tooling and Prototypes Directly from a CAD Model", Massachusetts Institute of Technology, pp. 143-151, Jan. 1990.
Williams, "Feasibility Study of Investment Casting Pattern Design by Means of Three Dimensional Printing", Department of Mechanical Engineering, abstract only; Sep. 25, 2001.
Armin Scharf, "Erster 3D-Endlosdrucker", zwomp.de, http://www.zwomp.de/2012/11/06/voxeljet-endlosdrucker/ dated Nov. 6, 2012.
Voxeljet's VXconcept—Continuous 3D printing for sand casting, You-Tube, Nov. 16, 2011, XP002713379, retrieved from the Internet URL: http://www.youtube.com/watch?v=hgIrNXZjIxU retrieved on Sep. 23, 2013.
Screen shots of URL: http://www.youtube.com/watch?v=hgIrNXZjIxU taken in approximately 5 second intervals on Nov. 12, 2015.
Jacobs et al., 2005 SME Technical Paper, title "Are QuickCast Patterns Suitable for Limited Production?".

* cited by examiner

3D INFILTRATION METHOD

CLAIM OF PRIORITY

This application is a national phase filing under 35 USC § 371 from PCT Application serial number PCT/DE2014/000621 filed on Dec. 5, 2014, and claims priority therefrom. This application further claims priority from German Patent Application DE 10 2013 020 491.7 filed on Dec. 11, 2013. PCT Application Number PCT/DE2014/000621 and German Patent Application Number DE 10 2013 020 491.7 are each incorporated herein in their entireties by reference.

DESCRIPTION

The invention relates to a method for producing solidified three-dimensional components as well as a material system suitable for a 3D printing method.

A method for producing three-dimensional objects from computer data is described in the European patent specification EP 0 431 924 B1. In this method, a particulate material is applied in a thin layer to a platform, and a binder material is selectively printed onto the particulate material, using a print head. The particle area onto which the binder is printed sticks together and solidifies under the influence of the binder and, if necessary, an additional hardener. The platform is then lowered by a distance of one layer thickness into a build cylinder and provided with a new layer of particulate material, which is also printed as described above. These steps are repeated until a certain, desired height of the object is reached. A three-dimensional object (component, molded body, 3D molded part) is thereby produced from the printed and solidified areas.

After it is completed, this object produced from solidified particulate material is embedded in loose particulate material and is subsequently removed therefrom. This is done, for example, using an extractor. This leaves the desired objects, from which powder deposits are removed, for example by manual brushing.

Of all the layering techniques, 3D printing based on powdered materials and the supply of liquid binder is the fastest method.

This method may be used to process different particulate materials, including natural biological raw materials, polymers, metals, ceramics and sands (not an exhaustive list).

Components that are produced using the methods described above, however, show the disadvantage that they have a porous structure and do not form solid, closed bodies. The porosity is caused by the building process and is unavoidable, for example, in the area of cement-bound materials. The porosity not only has disadvantages with regard to component stability and strength but it also involves numerous disadvantages in the long-term use of components of this type. In particular, when using such components outdoors, a long-term durability is not ensured, and material fatigue or damage may occur due to various influences.

Cement-based materials are widespread in the construction industry. In this field of technology, the production of components using 3D printing methods is particularly attractive under numerous aspects, such as economic feasibility, time savings and the variety of possible component shapes.

However, the use of components produced with 3D printing methods is problematic in many areas, since problems can be expected in long-term installation and occur to a proven degree, due to the porosity of the components.

First of all, frost shattering may occur in the components produced with 3D printing methods and thus damage or destroy the components. Penetrating water generates high compressive forces when it freezes during the winter and breaks apart the 3D cement component. A 3D-printed component would therefore not last for a year in regions that have a freezing period.

Secondly, a 3D component has a very large surface, due to its porosity. In outdoor areas, this surface is wetted with water for long periods after a rainfall. This circumstance is promoted by the fact that the overwhelmingly large part of the surface [sic; is] inside the component, which thus dries out only slowly, even in sunlight. This circumstance promotes the growth of mosses and fungi, whereby the component is quickly damaged and broken down.

Moreover, components produced with 3D printing techniques have a low strength, compared to conventionally cast components, due to their porosity. The reduced strength thus limits their use in construction, and their use in and of itself is problematic. Even components under less stress have to meet certain safety requirements, which is not ensured by 3D-printed components.

According to the prior art, methods are known for increasing the strength of 3D-printed components. Polymers are used, which infiltrate the porous component and solidify therein.

These polymers may increase the strength of 3D components. However, applying a two-component mixture is complex and not practical in 3D printing and in components produced with these methods. An automated method for strengthening components produced in this manner is unknown according to the prior art.

Another known method for strengthening 3D components is to infiltrate them with inorganic binders. However, the binders have to dry out in order to solidify. Since a solidified skin usually forms on the surface, the solidification operation is often delayed, or solidification does not take place within a "finite" period of time.

The same applies to polymer dispersions. The effect of the "skin formation" is particularly pronounced and thus disadvantageous for the use thereof. The unfavorable drying times are also a serious obstacle.

There has thus long been a need for a simple, economic and possibly automatable method for strengthening 3D printed components.

The object of the invention is therefore to provide a strengthening method or at least a method which avoids or at least partially avoids the disadvantages of the prior art.

BRIEF DESCRIPTION OF THE INVENTION

In one aspect, the invention relates to a method for producing strengthened 3D components, the component being able to be produced using known 3D printing methods, and the method being modified and supplemented in method steps in such a way that material is effectively introduced into the pores of the component and the strength of the component is significantly increased.

In another aspect, the invention relates to a material system for use in a 3D printing method.

In another aspect, the invention relates to devices which are suitable for carrying out the method.

In another aspect, the invention relates to components produced with the aid of the method according to the invention.

DETAILED DESCRIPTION OF THE INVENTION

A number of terms of the invention are explained in greater detail below, which are to be understood as discussed below in the context of the invention.

Within the meaning of the invention, "3D printing methods" are all methods known from the prior art, which make it possible to build components in three-dimensional molds and which are compatible with the described method components and devices. In particular, these are powder-based methods, for example SLS (selective laser sintering).

"Binder" within the meaning of the invention for the first method step may be any binder which is compatible with the layering material, e.g., water-based binders, organic and inorganic binders, which are known to those skilled in the art and which therefore do not need to be described in detail here. Examples are PolyPor B and PolyPor C, etc.

Within the meaning of the invention, "selective binder application" or "selective binder system application" may take place after each particulate material application or irregularly, depending on the requirements of the molded body and for the purpose of optimizing the production of the molded body, i.e., non-linearly and not in parallel after each particulate material application. "Selective binder application" or "selective binder system application" may thus be set individually and during the course of producing the molded body.

"Molded body" or "component" within the meaning of the invention are all three-dimensional objects that are produced with the aid of the method according to the invention and/or the device according to the invention and which have a nondeformability.

Any known 3D printing device that contains the necessary components may be used as the "device" for carrying out the method according to the invention. Common components include a coater, a build space, a means for moving the build space or other components, a dosing device and a heating means and other components which are known to those skilled in the art and therefore do not need to be listed in greater detail here.

All materials known for powder-based 3D printing, in particular sands, ceramic powders, metal powders, plastics, wood particles, fibrous materials, celluloses and/or lactose powders, may be used as "particulate materials." The particulate material is preferably a dry, free-flowing and a cohesive, firm powder.

A "hydraulically binding binder" represents a material system which, upon a certain water consumption, transitions from a water-soluble to a water-insoluble state. The water is permanently "integrated" into the solid material.

"Cement" within the meaning of the invention generally designates a fine powder which is used to adhere particles or grains to each other. The adhesion is produced by crystalline fibers, which grow out of the cement grains when water is added and which penetrate each other and thus become matted together.

The cement must be in "partially" hydrated form in the component. This means that only a small quantity of water is added to the cement during the printing process. This quantity is adapted experimentally to the necessary green strength.

"Green strength" within the meaning of the invention is defined as the strength with which components may be safely unpacked from the loose powder and which do not or do not relevantly change geometrically even during subsequent processes.

The result of the 3D printing process is generally a "porous body." In many cases, the porosity is not filled out during the printing process, since effects (such as massive shrinkage) occur hereby, which influence the accuracy of the components.

The invention and its preferred specific embodiments are described in greater detail below.

In general, the invention relates to a method for producing a component (3D molded body), wherein (a) a particle layer is applied to a building platform (102) in a first step with the aid of a powder coater (101); (b) a binder (400) is selectively applied in a second step with the aid of a binder dosing device (100); (c) the applied layer or layers is/are subjected to a heat treatment in another step with the aid of a heat source (600); (d) the building platform (102) is lowered (108) by the thickness of one layer, or the powder coater (101) and possibly additional device components is/are raised by the thickness of one layer; steps a) through d) are repeated until the component is built up. The powder coater (101) may deposit particulate material (110). The powder coater may traverse a build surface in a coater direction (106) that is generally perpendicular to the layers.

In particular, the invention relates to a method for producing three-dimensional components by means of a layering technique, material layers of the component(s) being applied using known layering methods and at least partially solidified in a first method step, the solidified areas at least partially having pores, and the component(s) being brought into contact with a water-containing medium in a second method step, and particulate material being used to build the material layers, which comprises or contains a material which binds or solidifies due to the introduction of an aqueous liquid.

A binder is preferably applied to selective areas of the material layers, and these areas are selectively solidified by the application of the binder. A water-containing binder, or any other binder which is compatible with the material used for layering, may be used. Different binder types or binder classes are conceivable, which may then be combined with the second method step.

One core of the invention is the provision of a porous molded body from a material with the aid of a hydraulically binding binder having a composition which represents an incomplete hydration of the binder.

The molded body has a sufficient strength for unpacking after the first manufacturing step. According to this invention, the molded body is subsequently treated with a water-based infiltrate, which is hardened by drying, and the infiltrate is dried in the interior by means of the further water demand of the hydraulic binder.

The inventors have surprisingly found that, in systems using hydraulically binding materials, a synergy effect may be achieved between particulate material used for building layers and an infiltrate which discharges water for the purpose of solidification and/or drying. The materials and quantities are selected in such a way that the quantity of water of the binder is selected in a first method step of the 3D printing process in such a way that a sufficient basic strength of the molded part is achieved, e.g., for the purpose of unpacking it. However, the material and the quantity of the material for infiltrating the pores—and, in particular, the water content thereof—are selected in such a way that the material building the molded body has sufficient water absorption capacity to solidify the infiltrate, which discharges water. At the same time, this water quantity precisely serves the purpose of further solidifying the particulate material of the molded body.

It was surprising that a method and a material system could be provided which may be combined in such a way that the water discharge and water absorption capacities correspond in such a way that an advantageous solidification may occur in both material types.

Molded parts produced in this manner furthermore demonstrate excellent material properties with respect, e.g., to their strength. In addition, dimensionally accurate molded parts with a high reproduction accuracy may be produced with the method according to the invention.

The building process is carried out according to the invention and preferably using a water-based print medium. The latter should not have any substances which hinder the binding of the hydraulically binding binder. The composition of the hydraulically binding binder may be adapted to the requirements of the medium.

The selective solidification is carried out using a quantity of water which is insufficient to completely bind the hydraulically binding binder.

The parts in the loose powder are subjected to a rest period following the printing process. This is necessary to achieve a suitable green strength. During this phase, the structural body not only changes the strength property, but the body also becomes water-insoluble.

The body is unpacked from the particulate material after the rest period. Adhering quantities of powder are subsequently removed. This may take place using a brush. Blowing with compressed air and blasting with particulate material have also proven to be successful.

Another drying phase may then follow. Remaining residual water is then expelled, so that it is not available for hydration.

After the component is dried, the infiltration takes place, using an infiltrate which binds by drying. For this purpose, the body may be brushed or sprayed with water glass. It is also possible to dip the component into a bath of the infiltrate. Multiple passes are also possible. Aqueous polymer dispersions are also preferably suitable for the infiltration.

It was surprisingly discovered that the drying process may be significantly influenced by an excess of non-hydrated cement. Bodies which are completely bound demonstrate a much longer drying time.

The infiltrate is generally already solidified during drying. In the case of water glass, both a physical solidification and a chemical reaction in the sense of a polymerization take place. This process may be additionally supported from the outside through heat and air movement.

Likewise, the edge layer may be influenced by gassing with $CO_2$. The chemical reaction of the solidification is accelerated in this manner.

Other preferred specific embodiments of the invention are as follows:

In the method according to the invention, the particulate material used for building the material layers is preferably a hydraulically binding material, preferably a cement or a gypsum. All hydraulically binding materials known to those skilled in the art may be used, which are compatible with each other within the meaning of the invention.

The water-containing medium is preferably a water glass or a water-based plastic dispersion, preferably an aqueous solution of sodium silicate, potassium silicate or lithium silicate.

The infiltration may take place partially or completely, or it may only essentially cover the surface of the pores. The water-containing medium preferably coats the component on the outside and preferably the surface of the pores, more preferably it essentially fills out the pores.

The quantity of the water-containing medium is selected in such a way that it is sufficient to essentially completely bind and solidify the particulate material used to build the material layers.

Molded parts which have a variable degree of strength and solubility may be produced with the method according to the invention; the molded parts and the particulate material building them are preferably essentially no longer water-soluble after binding.

The water-containing medium may furthermore contain other components which contribute to advantageous properties of the molded part. It preferably contains polymers.

An additional or alternative method step may follow, the component(s) being treated with another material or material mixture for the purpose of essentially filling in the pores.

The molded parts are allowed to rest after the first method step, the component produced in the first method step preferably being allowed to age-harden for at least 12 hours, preferably for 24 hours, prior to the second method step.

The hydraulically binding material is adapted to the other material components in terms of quantity, mixture, etc. An excess of hydraulically binding material is preferably present in the component(s) prior to the second method step.

The water-containing medium may be applied with the aid of all suitable means. The component(s) is/are preferably brushed or sprayed with the water-containing medium or dipped therein.

Other treatment steps or means may preferably be used. The component(s) is/are preferably additionally treated with heat and/or air change after the second method step. The component(s) may also be subjected to a gassing, preferably with $CO_2$.

The method may be designed in such a way that a series of consecutive steps may take place in the second method step, using different materials, which are suitable for solidifying the particulate material and/or essentially filling out the pores.

The invention furthermore preferably relates to a material system which is suitable for producing three-dimensional components by means of a layering technique, which contains or comprises two components, the first component being a hydraulically hardening material, preferably a cement or a gypsum, and the second component being or containing an aqueous solution-containing material, which is hardened by the discharge of water.

The material system according to the invention may contain sand or artificial sands; it preferably contains hollow glass balls. It may also preferably contain other powdered materials.

The material preferably contains a sodium, potassium or lithium silicate.

It may also contain other materials, preferably a polymer dispersion.

The invention furthermore relates to devices which are suitable for carrying out the method according to the invention as well as molded parts, which were produced using the method.

Figure 1:
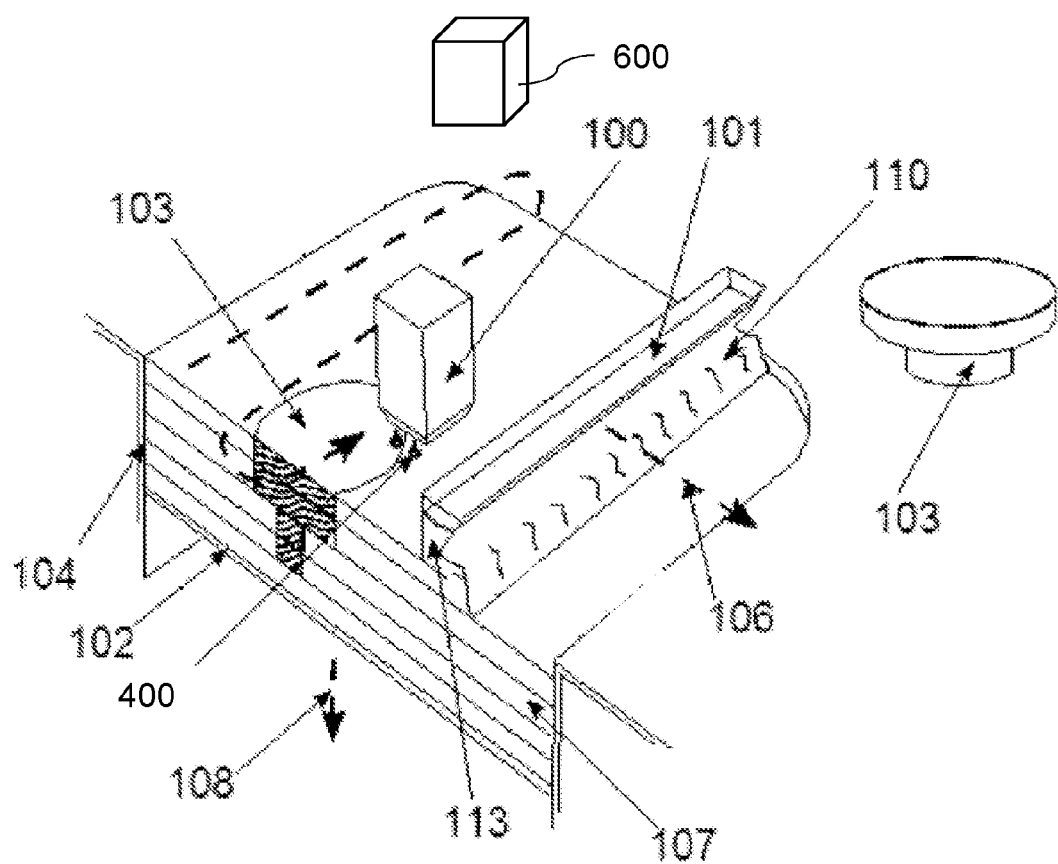
FIG. 1: shows a schematic representation of the components of a powder-based 3D printer in a sectional isometric view.
Figure 2:
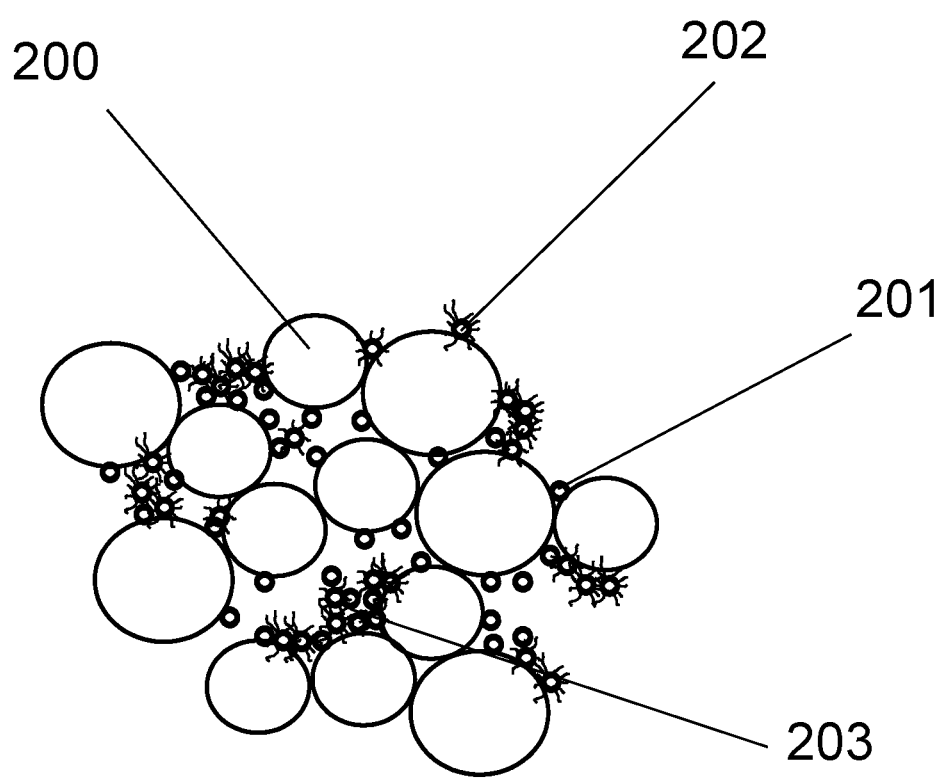
FIG. 2: shows a schematic representation of a porous body, which includes non-hydrated or only partially hydrated cement particles.
Figure 3:
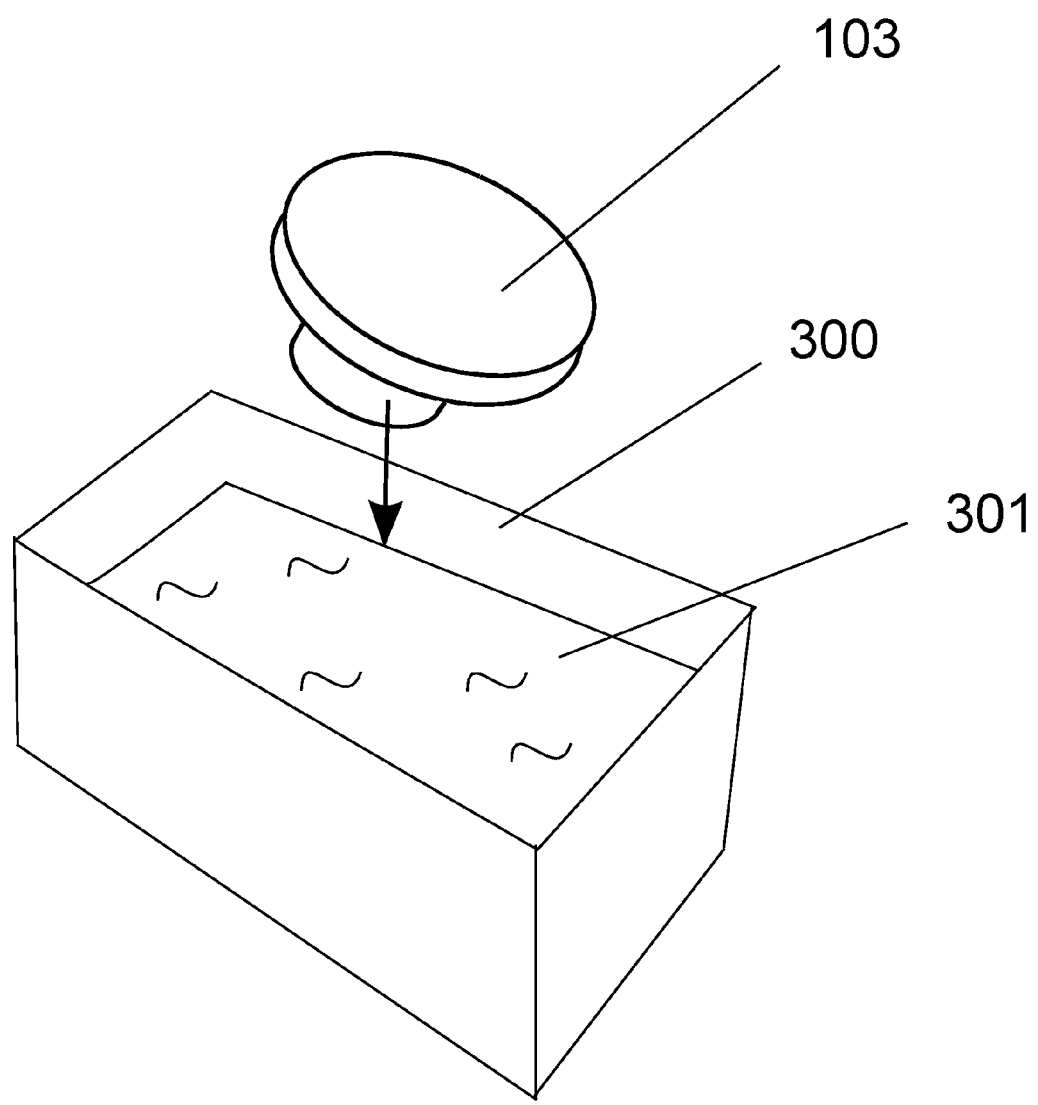
FIG. 3: shows an immersion bath of water glass.

Other details and one preferred exemplary embodiment of the method are discussed below.

EXAMPLE

Producing a molded part using the method according to the invention

In the first step, a particulate material is applied in a thin layer to a building platform. In this preferred specific embodiment, the particulate material comprises silica sand (200) having an average grain size of 140 μm. Before being applied, this sand is dried until the residual moisture is less than 0.3 wt. %. A cement grain mixture (201), which is adapted to the pore space, is added to this sand mixture. The reactivity of this cement may be adapted. The layer thickness in this process is 0.25 mm.

Pyrogenic silicic acid in a proportion of 0.5 wt. % is also added to modify the flowability of the particle mixture. The cement may be, for example, a CA270-type calcium aluminate cement from Almatis or an Alphabond 300 from Almatis.

The binding fluid contains a silicate in order to adjust the printability. The latter is present in an aqueous solution. In addition Surfynol 440 surfactants are used to further optimize the fluid for ink-jet print heads.

In total, liquid binder in a proportion of 20 wt. % with respect to the particulate material quantity is added during the build process. The cement "suffers" from lack of water and thereby only partially hardens (203).

After printing, the building process is paused, and the molded part rests in the powder for 24 hours. No special ventilation measures are taken. The cement continues to dry out, due to the diffusion effects in the powder surrounding the components. This, in turn, is useful for the partial hydration.

Unpacking must take place carefully, since the structural body has only green strength. Deposits are removed with the aid of a hard brush in a first step. Afterward, component (103) is carefully blasted with sand.

This part (103) is dried for another 24 hours in a circulating air oven at a temperature of 40° C. This further reduces the residual moisture.

The infiltration takes place after this step. Potassium silicate 28/30, for example, may be used as infiltrate (300). It may be applied with a brush. The penetration performance may be improved by preheating the mold. Another good option is to dip component (103) into a bath (301) of the infiltrate, since the partially hydrated cement is not water-soluble.

This procedure is repeated directly until the infiltrate exits component (103) again. The strength-increasing effect may be intensified thereby.

Component (103) treated in this manner is age-hardened in air for another day. The strength has now increased significantly. The drying process was completed to a large extent due to subsequent hydration of the cement. This process may be accelerated with the aid of heat. The solidification of the surface may be accelerated by air draft.

According to the invention, component (103) is now solidified and condensed. Other layers having infiltration material may now be easily applied for the purpose of complete sealing or decoration. These layers may be water glass layers, which harden quickly in thin layers. However, polymers which are optimized for outdoor areas may also be used.

LIST OF REFERENCE NUMERALS

100 Binder dosing device
101 Powder coater
102 Building platform
103 Component (3D molded part)
104 Build space boundary
107 Powder layers
200 Sand particles
201 Non-hydrated cement
202 Hydrated cement
203 Solidified area
300 Immersion bath
301 Infiltrate

What is claimed is:

1. A method for producing one or more three-dimensional components by means of a layering technique comprising the steps of:
   applying material layers of the three-dimensional component(s) over a build platform;
   at least partially solidifying a first portion of the material layers, wherein the first portion at least partially has pores, and a second portion of the material layers is unbound;
   separating the second portion from the three-dimensional component(s); and
   contacting the three-dimensional component(s) with a water-containing medium, wherein a particulate material is used to build the material layers, the particulate material including a build material which binds or solidifies due to the introduction of the water-containing medium.

2. A part produced according to the method of claim 1.

3. A method for producing one or more three-dimensional components by means of a layering technique comprising the steps of:
   applying material layers of the three-dimensional component(s) over a build platform;
   at least partially solidifying a first portion of the material layers, wherein the first portion at least partially has pores, and a second portion of the material layers is unbound;
   separating the second portion from the three-dimensional component(s); and
   contacting the three-dimensional component(s) with a water-containing medium, wherein a particulate material is used to build the material layers, the particulate material including a build material which binds or solidifies due to the introduction of the water-containing medium;
   wherein the step of contacting includes a series of consecutive steps using different materials which are suitable for solidifying the particulate material and/or essentially filling out the pores.

4. The method according to claim 3, wherein the particulate material used to build the material layers includes a hydraulically binding material.

5. The method according to claim 3, wherein the method includes a step of treating the one or more component(s) with another material or material mixture, the step including essentially filling out the pores.

6. The method according to claim 3, wherein the method includes a step of age-hardening for at least 12 hours after the step of solidifying and before the step of contacting.

7. The method of claim 4, wherein a portion of the hydraulically binding material in the three-dimensional component(s) is unbound after the step of removing and prior to the step of contacting.

8. The method of claim 4, wherein the one or more component are brushed or sprayed with the water-containing medium or dipped in the water-containing medium.

9. The method of claim 8, wherein the method comprises a step of treating the one or more components with heat and/or an air exchange after the step of contacting.

10. The method of claim 8, wherein the method comprises a step of subjecting the one or more components to gassing with $CO_2$.

11. The method of claim 3, wherein
the particulate material used to build the material layers is a hydraulically binding material;
the method includes a step of treating the one or more components with another material or material mixture, the step including essentially filling out the pores; and
the method includes a step of age-hardening for at least 12 hours after the step of solidifying and before the step of contacting.

12. The method of claim 11, wherein
a portion of the hydraulically binding material in the one or more component(s) is unbound after the step of removing and prior to the step of contacting
the one or more components are brushed or sprayed with the water-containing medium or dipped in the water-containing medium, and/or additionally treated with heat and/or an air exchange after the contacting step.

13. The method of claim 12, wherein the method includes the step of treating with the air exchange; and includes the subjecting the one or more components to gassing with $CO_2$.

14. A material system, for producing a three-dimensional part by means of a layering technique, comprising:
a first component being a hydraulically hardening material, and
a second component being or containing an aqueous solution-containing material, which is hardened by the discharge of water;
wherein the material system includes sand or artificial sands; a powdered material; and a polymer dispersion.

15. The material system of claim 14, wherein the a hydraulically hardening material is a cement or a gypsum.

16. The material system of claim 15, wherein the material system includes
i) hollow glass balls; or
ii) a powdery material selected from a sand, a silica sand, a stone dust, a sodium silicate, a potassium silicate, and a lithium silicate.

17. A method for producing one or more three-dimensional components by means of a layering technique comprising the steps of: applying material layers of the three-dimensional component(s) over a build platform;
at least partially solidifying a first portion of the material layers, wherein the solidified areas at least partially have pores, and a second portion of the material layers is unbound;
separating the second portion from the three-dimensional component(s); and
contacting the three-dimensional component(s) with a water-containing medium, wherein a particulate material is used to build the material layers, the particulate material including a build material which binds or solidifies due to the introduction of the water-containing medium;
wherein the particulate material used to build the material layers includes a hydraulically binding material;
wherein
the hydraulically binding material includes a cement or a gypsum;
the water-containing medium is a water glass or a water-based plastic dispersion;
the water-containing medium coats the one or more components on the outside; and
the water-containing medium contains additional components including a polymer.

18. The method of claim 17, wherein
the water-containing medium is an aqueous solution of sodium silicate, potassium silicate or lithium silicate; and
the water-containing medium coats the surfaces of the pores.

19. The method of claim 18, wherein
the water-containing medium essentially fills out the pores;
the quantity of the water-containing medium is selected in such a way that it is sufficient to essentially completely bind and solidify the particulate material used to build the material layers; and
the particulate material is essentially no longer water-soluble after the binding.

20. A method for producing one or more three-dimensional components by means of a layering technique comprising the steps of:
layering a powder build material containing a hydraulic binder to form a layer;
selectively solidifying at least a portion of the layer by applying water to the portion in a quantity insufficient to completely bind the hydraulic binder so that the portion of the layer has unbound hydraulic binder,
repeating the layering and selectively solidifying steps until a partially bound product is formed,
removing unsolidified powder from the product and then contacting the partially bound product with a water containing medium to react with the unbound hydraulic binder in the partially bound product.

* * * * *